(12) United States Patent
Yinko et al.

(10) Patent No.: US 8,061,198 B2
(45) Date of Patent: Nov. 22, 2011

(54) MEASURING CUP SENSOR AND SYSTEM

(75) Inventors: Richard Yinko, Sheboygan, WI (US); Abby Yinko, Sheboygan, WI (US)

(73) Assignee: Yinko IP Holdings, LLC, Sheboygan, WI (US)

( * ) Notice: Subject to any disclaimer, the term of this patent is extended or adjusted under 35 U.S.C. 154(b) by 560 days.

(21) Appl. No.: 12/208,678

(22) Filed: Sep. 11, 2008

(65) Prior Publication Data

US 2010/0058856 A1    Mar. 11, 2010

(51) Int. Cl.
*G01F 23/00* (2006.01)
*G01F 19/00* (2006.01)
(52) U.S. Cl. ......................... 73/428; 73/290 V
(58) Field of Classification Search .................... 73/426, 73/427, 428
See application file for complete search history.

(56) References Cited

U.S. PATENT DOCUMENTS

| | | | |
|---|---|---|---|
| 3,872,936 A * | 3/1975 | Baumann et al. | 177/15 |
| 3,986,012 A | 10/1976 | Loshbough et al. | |
| 4,121,457 A | 10/1978 | Yoshida et al. | |
| 6,776,037 B2 | 8/2004 | Maatuk | |
| 2002/0100317 A1 * | 8/2002 | Deserno et al. | 73/290 V |
| 2003/0140694 A1 | 7/2003 | Usui et al. | |
| 2005/0217369 A1 * | 10/2005 | Holappa et al. | 73/304 C |
| 2006/0007259 A1 | 1/2006 | Zhang | |

FOREIGN PATENT DOCUMENTS

JP          2004198108 A * 7/2004

\* cited by examiner

*Primary Examiner* — Hezron E Williams
*Assistant Examiner* — Nathaniel Kolb
(74) *Attorney, Agent, or Firm* — Michael Best & Friedrich LLP

(57) ABSTRACT

A measuring device for use with at least one measuring cup comprised of: a microprocessor, an ultrasonic transmitter, and an ultrasonic sensor, all positioned on a printed circuit board housing, all of which are contained within a housing, and a display screen on the housing. The transmitter emits a signal (e.g. an ultrasonic pulse that reflects off of the top surface of a liquid contained in the measuring cup,) and the ultrasonic sensor detects the reflected ultrasonic pulse. The microprocessor calculates the precise volume of liquid within the measuring cup and displays the volume on the display screen. The measuring device can alternately be programmed to emit an alert when a predetermined volume is reached. The measuring device and measuring cup unit can also be used with solids and/or slurries.

10 Claims, 3 Drawing Sheets

MEASURING CUP SENSOR AND SYSTEM

FIELD OF INVENTION

This invention relates generally to the field of measuring devices, and in particular to the field of a device and system for accurately measuring the volume of a liquid or solid in a container using ultrasound.

BACKGROUND

Figure 1:
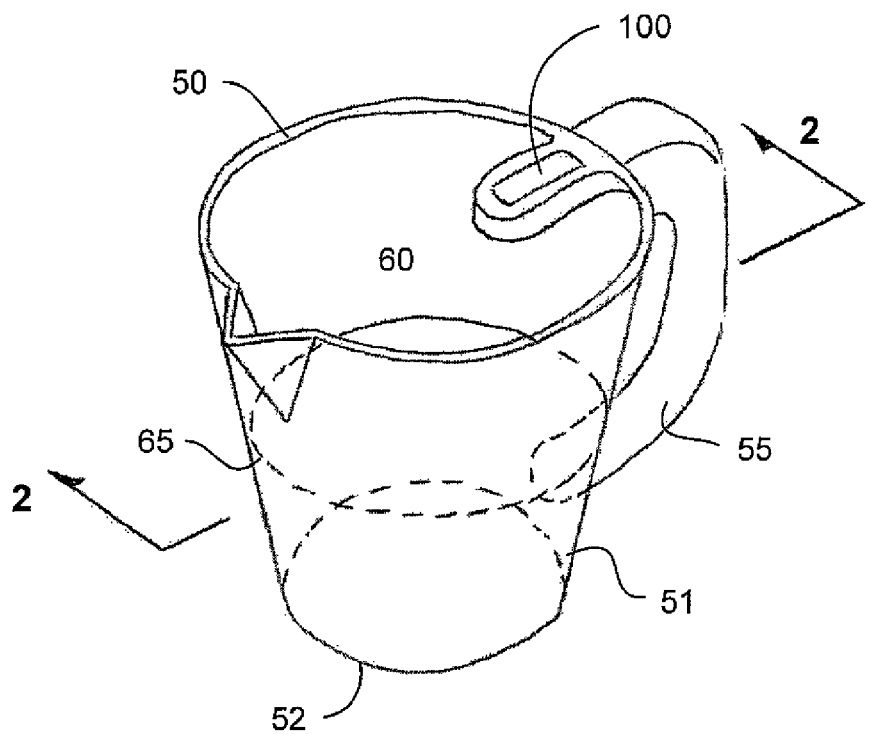
FIG. 1 show a top perspective view of a measuring cup with one embodiment of the measuring device.

Measuring cups are known and can be made from a variety of materials, including plastic, metal, and glass, and most other materials which can be safely placed on a dishwasher. Measuring cups traditionally have volumetric indicia marked on the cup's side wall. When made of glass (e.g., Pyrex®) or another transparent material, the user must place the measuring cup upon a level surface, pour the contents to be measured into the measuring cup, either stoop down to the vertical level of the measuring cup or lift the measuring cup to eye level and attempt to hold the measuring cup steady, and attempt to visually detect the bottom of a liquid meniscus or to a level surface of solid contents in order to read the volume of the liquid or solid in the measuring cup. Depending on how precise a measurement is needed, such an imprecise measurement may be inadequate. In addition, for opaque materials, such as some plastics or metal, such a side view is impossible, making precise measurement of the solid or liquid in the measuring cup impossible.

Such a method of measuring the solid or liquid contents in a measuring cup may be inadequate for users with poor eyesight or who find it difficult to position themselves to accurately read the volume of contents in a measuring cup placed on a level surface, but may also have just as much difficulty in lifting the measuring cup to eye level and holding the cup steady to read the volume of contents held therein.

Accurate measurements may be necessary for cooking, measuring medication, mixing chemicals, color formulations, fragrances, and for combining solutes and solvents. Moreover, in some applications, precise volumetric measurement of the contents within a measuring cup may be critical. For example, mixing chemicals, mixing solutions for automobiles, fertilizers, paint, pharmaceutical, and educational uses can all require very specific measurements of solids and/or liquids.

GLOSSARY

As used herein, the term "measuring cup" refers to any type or style of container, receptacle, or vessel into which it is desirable to pour a measured quantity of fluid. A measuring cup can be any shape and made of any material and may be used for cooking, food storage, medications, chemicals, paints or biological materials as they are poured into the measuring cup. A measuring cup may also be a reservoir container for collecting and measuring a fluid as it accumulates which is traditionally used for dishes and cooking receptacle A measuring cup may have any shape, including round, oval, tubular, square, rectangular, conical, frusto-conical, a hollow representation of a person, a hollow representation of an object, a geometric representation and an unique artistic representation.

As used herein, the term "selectively attached" refers to an device or component which may be removed and reattached without damaging other components or devices with which it is used, As used herein, the term "transmitter" means any component or device which transmits a signal.

As used herein, the term "tare button" refers to a button, pressure sensitive component, protuberance, touch pad or any other component that interacts with the software and/or electronic circuitry of a measuring device as disclosed herein to reset the counter device of the measuring device to zero (0) and allows the device to measure or re-measure the amount of liquid added (or removed) from that point.

As used herein, the term "measuring device" means a device includes a mounting component or housing for a sensor. A measuring device may also include a microprocessor, a circuit board and optional software for a digital display. A measuring device may be selectively attached to a measuring cup. A measuring device may include power source including but not limited to an electrical power supply, a battery and/or solar power.

As used herein, the term "sensor" means a device that measures a physical quantity and converts it into a signal which can be read by an observer or by an instrument.

As used herein, the term "signal" includes but is not limited to a device for reading ultrasound, infrared waves, microwaves, radio waves, ultraviolet waves, or any other pulse or wave known or that may be developed that can be emitted, reflected, and detected to determine distance between the emission point and the reflective surface to measure the quantity of fluid in a measuring cup.

As used herein, the term "time of flight sensor" means any device or method used to measure the time that it takes for a particle, object or stream to reach a detector while traveling over a known distance.

As used herein, the term "printed circuit board" means a component used to mechanically support and electrically connect electronic components using conductive pathways, or traces, etched from copper sheets laminated onto a non-conductive substrate. A printed circuit board may support drivers for a display, sensors and microprocessors, as well as other software drivers and components to support the functions of measuring device.

DETAILED DESCRIPTION OF EMBODIMENTS OF THE INVENTION

For the purpose of promoting an understanding of the present invention, references are made in the text hereof to embodiments of a measuring cup, only some of which are depicted in the figures. It should nevertheless be understood that no limitations on the scope of the invention are thereby intended. One of ordinary skill in the art will readily appreciate that modifications such as the dimensions, size, and shape of the components, alternate but functionally similar materials from which the measuring cup is made, and the inclusion of additional elements are deemed readily apparent and obvious to one of ordinary skill in the art, and all equivalent relationships to those illustrated in the drawings and described in the written description do not depart from the spirit and scope of the present invention. Some of these possible modifications are mentioned in the following description. Therefore, specific details disclosed herein are not to be interpreted as limiting, but rather as a basis for the claims and as a representative basis for teaching one of ordinary skill in the art to employ the present invention in virtually any appropriately detailed apparatus or manner.

It should be understood that the drawings are not necessarily to scale, emphasis instead being placed upon illustrating the principles of the invention. In addition, in the embodiments depicted herein, like reference numerals in the various drawings refer to identical or near identical structural elements.

Moreover, the term "substantially" or "approximately" as used herein may be applied to modify any quantitative representation that could permissibly vary without resulting in a change in the basic function to which it is related. For example, various embodiment of the measuring cup may have diffently positoned or varying numbers of sensors, and still be within the scope of the invention if its functionality is not materially altered.

Referring now to the drawings, FIG. 1 shows a top perspective view of measuring cup 50 as used in conjunction with one (1) embodiment of measuring device 100. Measuring cup 50 includes side surface 51, bottom surface 52, and handle 55. Side surface 51 and bottom surface 52 form space 60, which is capable of holding liquid 65. In the embodiment shown, measuring cup 50 is clear and made of Pyrex®. However, it should be understood that measuring cup could be made of any alternate material, be constructed in almost any shape, and be capable of containing almost any volume. In addition, it should be understood that although measuring cup 50 is shown as holding liquid 65, measuring cup can also be used to hold a solid, a slurry, or any other material. For example, FIG. 1a illustrates a measuring cup 50 which is square in shape.

Also visible in FIG. 1 is measuring device 100. Measuring device 100 is positioned adjacent to the top portion of handle 55. However, it should be understood that measuring device 100 can be positioned anywhere on measuring cup 50 so long as it is above the uppermost surface of liquid 65 (or solid or any other material contained within measuring cup 50).

Figure 2:
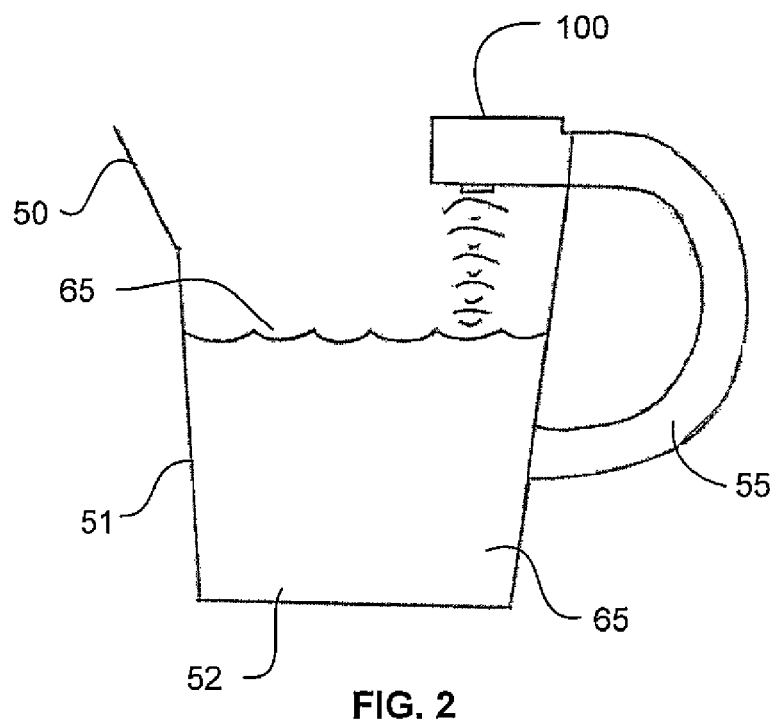
FIG. 2 shows a cross-sectional view of the embodiment of the measuring cup and measuring device along line 2-2 in FIG. 1.

FIG. 2 shows a cross-sectional view of the embodiment of measuring cup 50 and measuring device 100 shown in FIG. 1 along line 2-2. Measuring device 100, as will be described in detail with respect to FIG. 3, emits ultrasonic pulse 200. Ultrasonic pulse 200 hits top surface 66 of liquid 65 (or other material contained within measuring cup 50) and is reflected upward. Measuring device 100 detects the reflected ultrasonic pulse 201. By knowing the dimensions of measuring cup 50 and measuring the height of liquid 65, the exact amount of liquid 65 contained within measuring cup 50 can be determined. It should be understood, too, that although the embodiment of measuring device 100 shown and described herein uses an ultrasonic pulse, measuring device 100 can alternately use infrared waves, microwaves, radio waves, ultraviolet waves, or any other pulse or wave known or that may be developed that can be emitted, reflected, and detected to determine distance between the emission point and the reflective surface.

Figure 3:
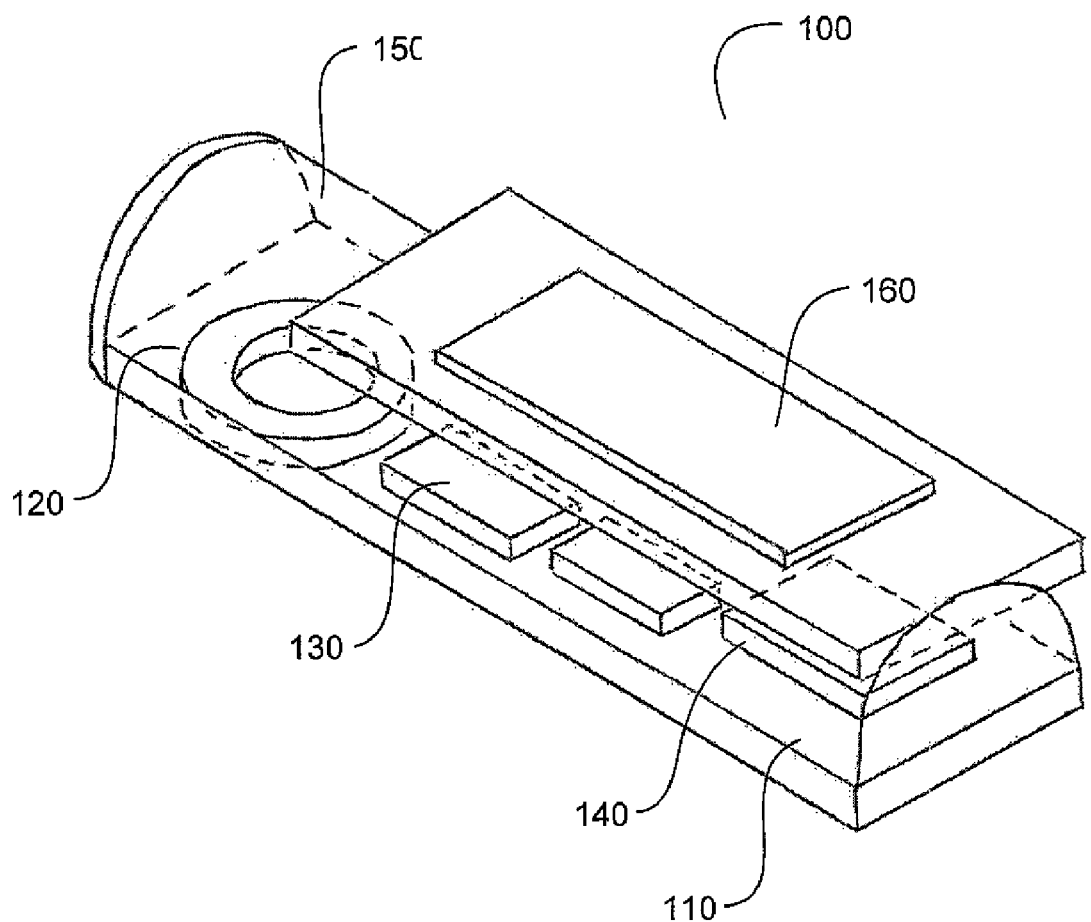
FIG. 3 shows a top perspective view of one embodiment of the measuring device.

FIG. 3 shows a top perspective view of one embodiment of measuring device 100. In the embodiment shown, measuring device 100 is comprised of printed circuit board (PCB) 110, which includes a sensor sends out a signal such as ultrasound, sound, ultrasonic, laser, light, infrared waves, microwaves, radio waves, ultraviolet waves, or any other pulse or wave known or that may be developed that can be emitted, reflected, and detected to determine distance between the emission point and the reflective surface. In the embodiment shown, printed circuit board 110 further includes a driver for a digital display.

In the embodiment shown, sensor 110 is a is a time of flight sensor times how long to echo back 120, microprocessor 130, ultrasonic transmitter 140, housing 150, and display screen 160. Sensor 120, microprocessor 130, and ultrasonic transmitter 140 are positioned on PCB 110 and electrically connected to each other. PCB 110, sensor 120, microprocessor 130, and ultrasonic transmitter 140 are all contained within housing 150. Display screen 160 is positioned on housing 150 and also electrically connected to microprocessor 130.

Ultrasonic transmitter 140 emits an ultrasonic pulse (not shown), downward toward the bottom surface (not shown) of the measuring cup (not shown). The ultrasonic pulse reflects off of the top surface of the liquid (not shown) contained within the measuring cup, which is then detected by sensor 120. By knowing the dimensions of the measuring cup, i.e., the diameter of the base and the angle of the side surfaces of the measuring cup and measuring the distance between sensor 120 and the liquid, the exact volume of the liquid contained within the measuring cup can be determined.

As can be appreciated, the volume of liquid contained in the measuring cup depends not only on the distance between measuring device 100 and the top surface of the liquid, but also on the dimensions of the measuring cup. That is, if the measuring cup is wider or shorter, of a shape other than circular, or the sides rise at an alternate angle, then measuring device will not be accurate. Thus, measuring device 100 is only usable with one (1) specific measuring cup or one of identical dimensions. However, microprocessor 130 can be programmed to work with multiple and alternately shaped measuring cups. In such an embodiment, measuring device 100 must be able to be removed from measuring cup, as opposed to being fixed to the measuring cup, as in the embodiment shown.

In one embodiment, measuring device 100 may have a sensor included on circuit board 110. In other embodiments, sensors may placed in alternate locations and a measuring device or measuring cup may include multiple sensors. For example, various embodiments may have sensors places in various locations on the sides or bottom of measuring cup 50, on measuring device 100, or on printed circuit board 110. Depending on the extent to which the pin protrudes into the hole of measuring device 100, microprocessor 130 reads with which measuring cup measuring device 100 is being used.

Additionally, alternate embodiments of measuring device 100 may include various audio components such as devices which beep when certain levels are detected by a microprocessor, a digital display or a bar code reader Microprocessor 130 may include various software drivers and components to read sensor signal, and generate varying types of audio output and visual displays. In addition, measuring device 100 can further be used to measure the contents of multiple measuring devices, and allows a user to manually enter or otherwise provide input readable by a software component for which measuring cup is being used.

One (1) way that the exact volume of the liquid can be communicated to a user is via display screen 160. In the embodiment shown, display screen 160 is an LCD. Display screen 160 can face the handle (not shown), or can face left or right for a left-handed or right-handed user. In an alternate embodiment of measuring device, display screen 160 can be programmed to change between a left display and a right display with the touch of a button (not shown). Furthermore, display screen 160 can further include a button (not shown) that alternates between metric (e.g., milliliters) and English units (e.g., ounces).

In addition, in one (1) embodiment, measuring device 100 repeatedly monitors the volume contained within the container and display the volume on display screen 160. The user (either by hand or using an automated process) can then stop adding liquid to the container. In an alternate embodiment, the desired volume is programmed into measuring device 100 and an alert (which can be audio, visual, or both) indicates to the user that the desired volume has been reached. An additional button (not shown) can be used to select between various alert signals and/or to turn off the alert.

In addition, measuring device 100 can further include a tare button (not shown). The tare button allows a user to add a volume of liquid or solid to the measuring cup, zero measuring device 100, and then add a volume of another liquid or solid.

Microprocessor 130 can be programmed to emit the ultrasonic pulse at any interval. In the embodiment shown, ultrasonic pulse is emitted every half second, but microprocessor 130 can be programmed to emit the ultrasonic pulse at less frequent or more frequent intervals, as long as the required accuracy is maintained.

Figure 4:
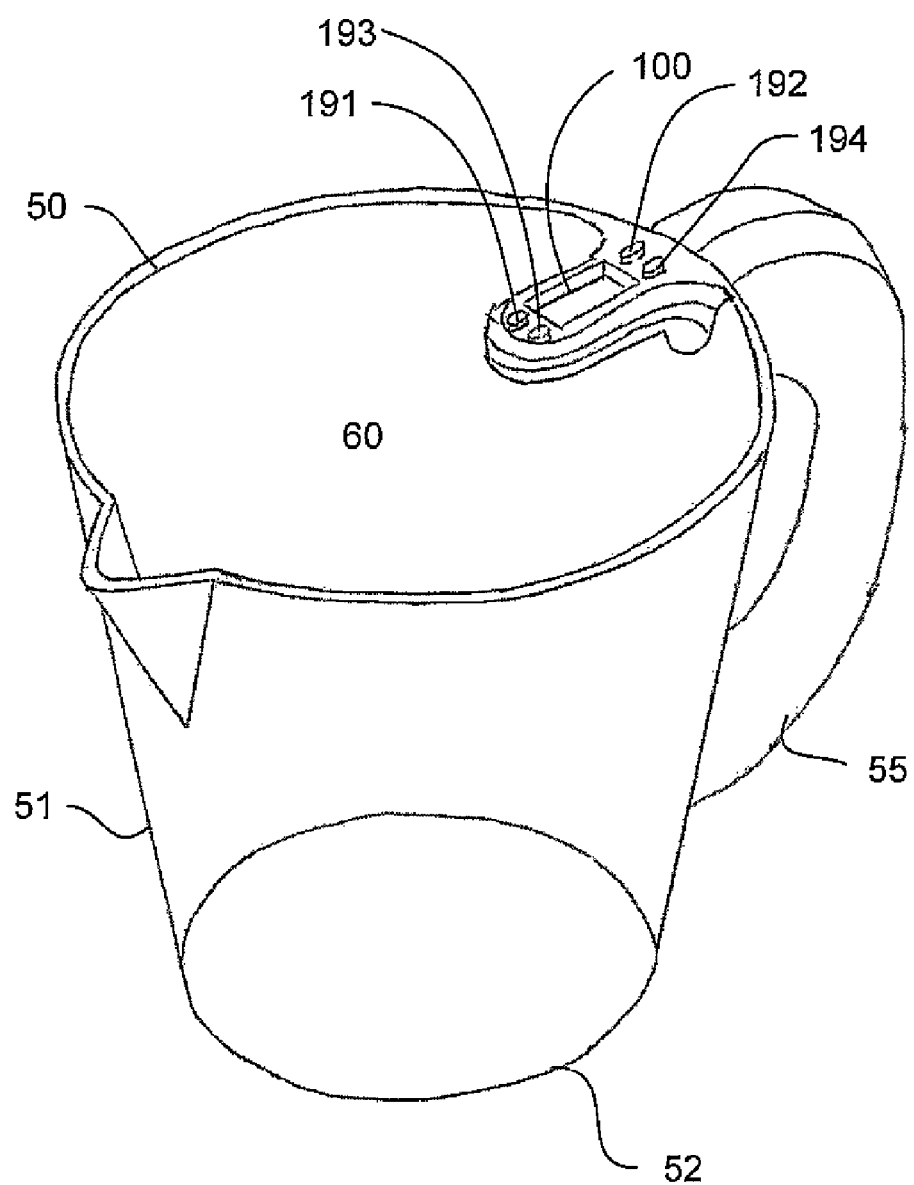
FIG. 4 shows a top perspective view of a measuring cup with an alternate embodiment of the measuring device.

In another alternate embodiment of measuring device 100, measuring device 100 further includes an on/off button (not shown; see FIG. 4 and description of same).

FIG. 4 shows a top perspective view of measuring cup 50 with an alternate embodiment of measuring device 100. In this embodiment, measuring device 100 further includes four (4) buttons, 191, 192, 193, 194. Button 191 is an on/off button, button 192 is a tare button, button 193 allows the display to be converted between metric and English units, and button 194 allows selection between the types of alerts that the user will receive when measuring cup 50 contains a predetermined volume of liquid or solid. However, one of ordinary skill in the art will recognize that buttons 191, 192, 193, 194 can have any of the functions described supra and that a greater or lesser number of buttons can be included on measuring device 100.

Referring to the figures collectively, measuring cup 50 and measuring device 100 can be used to volumetrically measure liquids, solids, and slurries. In addition, measuring cup 50 and measuring device 100 can be used in a variety of applications, including measuring ingredients for cooking, mixing chemicals in a laboratory or pharmacy, mixing solutions for automobiles, fertilizers, mixing paints to create a precise match between batches, and educational uses, and any other application that can benefit from precise volumetric determinations. In addition, measuring cup 50 and measuring device 100 can be used by those that may lack the manual dexterity or eyesight for precise volumetric measurements.

While the measuring cup and measuring device have been shown and described with respect to several embodiments and uses in accordance with the present invention, it is to be understood that the same is not limited thereto, but is susceptible to numerous changes and modifications as known to a person of ordinary skill in the art, and it is intended that the present invention not be limited to the details shown and described herein, but rather cover all such changes and modifications obvious to one of ordinary skill in the art.

The invention claimed is:

1. A measuring cup device for use with a first measuring cup having a first volume and a first shape defining the dimensions of the first measuring cup, the measuring cup device comprising:
    a housing including an attachment device, the attachment device configured to couple the housing to a measuring cup;
    a transmitter supported by the housing for transmitting a first signal;
    a sensor supported by the housing for receiving the first signal; and
    a microprocessor supported by the housing, the microprocessor being programmed with the dimensions of the first measuring cup, the microprocessor being electrically coupled to the sensor for receiving the first signal from the sensor, the microprocessor outputting a fluid level signal indicating a quantity of fluid within the first measuring cup when the housing is coupled to the first measuring cup;
    a control button supported by the housing and electrically coupled to the microprocessor, the control button operable to change a parameter of the microprocessor; and
    wherein the housing is removable as a single unit from the first measuring cup and connectable to a second measuring cup having a second volume and a second shape defining the dimensions of the second measuring cup, wherein the dimensions of the second measuring cup are different than the dimensions of the first measuring cup.

2. The measuring cup device of claim 1 wherein the microprocessor is programmed with the dimensions of the second measuring cup, and the microprocessor outputting a fluid level signal indicating a quantity of fluid within the second measuring cup when the housing is coupled to the second measuring cup.

3. The measuring cup device of claim 2, wherein the control button is used to indicate to the microprocessor whether the measuring cup device is connected to the first measuring cup or the second measuring cup.

4. The measuring cup device of claim 3, further including a display screen operatively connected to the microprocessor, and wherein the display screen generates a visual image representing the quantity of fluid within the measuring cup the housing is attached to.

5. The measuring cup device of claim 3, further including an audio device and wherein the audio device generates a sound representing the quantity of fluid within the measuring cup the housing is attached to.

6. The measuring cup device of claim 3, wherein each of the first measuring cup and the second measuring cup includes a side surface and a handle, and wherein the attachment device is configured to removably engage one of the side surface and the handle of a corresponding measuring cup.

7. The measuring cup device of claim 6, wherein the attachment device is configured to removably engage a top portion of the handle and the housing is configured to extend into the corresponding measuring cup.

8. The measuring cup device of claim 3, wherein the transmitter transmits the first signal toward a bottom surface of the first measuring cup when the housing is coupled to the first measuring cup, and wherein the transmitter transmits the first signal toward a bottom surface of the second measuring cup when the housing is coupled to the second measuring cup.

9. The measuring cup device of claim 3, further including a tare button supported by the housing and attached to the microprocessor to zero the measuring cup device.

10. The measuring cup device of claim 3, further comprising a volume set button supported by the housing and attached to the microprocessor, to indicate to the microprocessor a desired volume, and wherein the microprocessor device outputs an alert signal and the audio device emits an alert sound when the quantity of fluid within the measuring cup equals the desired volume.

* * * * *